May 31, 1966 E. F. GUSTAFSON 3,253,872

DEVICE FOR STORING AND DISPLAYING CARDS

Filed May 1, 1959

Inventor
Everett F. Gustafson

Graf, Nierman & Burmeister
Attorneys

United States Patent Office 3,253,872

Patented May 31, 1966

3,253,872

DEVICE FOR STORING AND DISPLAYING CARDS

Everett F. Gustafson, 1320 Ardmore Ave., Chicago, Ill.

Filed May 1, 1959, Ser. No. 810,432
8 Claims. (Cl. 312—189)

The present invention relates to devices for storing and displaying a relatively large number of cards, such as the calling cards in common use and the like.

Many people, particularly in the commercial world, carry calling cards which are presented to new acquaintances for the purpose of providing them with a ready reference to the person's address and phone number. Such calling cards vary greatly in dimensions, and are not readily stored.

Prior to the present invention, the information on such cards was either transferred to a more convenient reference device, or the cards have been secured to a larger standard sized card and stored in a conventional card file. Prior art devices for storing and displaying cards have required cards of uniform dimensions. In addition to the conventional box card file, cards have been secured to vertical plates, a number of cards on each side of a plate, and the plates mounted to rotate about a vertical axis. Since each card rests flat against the surface of one of the vertical plates, there is a definite limit on the number of cards which may be held by such a storage device, and further, it is necessary to reserve space for additional cards if the cards are to be arranged in alphabetical order.

It is one of the objects of the present invention to provide a storage and display device for cards which does not require the cards to be of standard dimensions.

Further, it is an object of the present invention to provide a novel card storage and display device which facilitates insertion of cards in any order, facilitates removal of the cards, and requires very little space.

These and further objects of the present invention will be more readily appreciated from a further reading of this disclosure, particularly when viewed in the light of the drawings, in which.

Figures 1, 2, 3, 4:
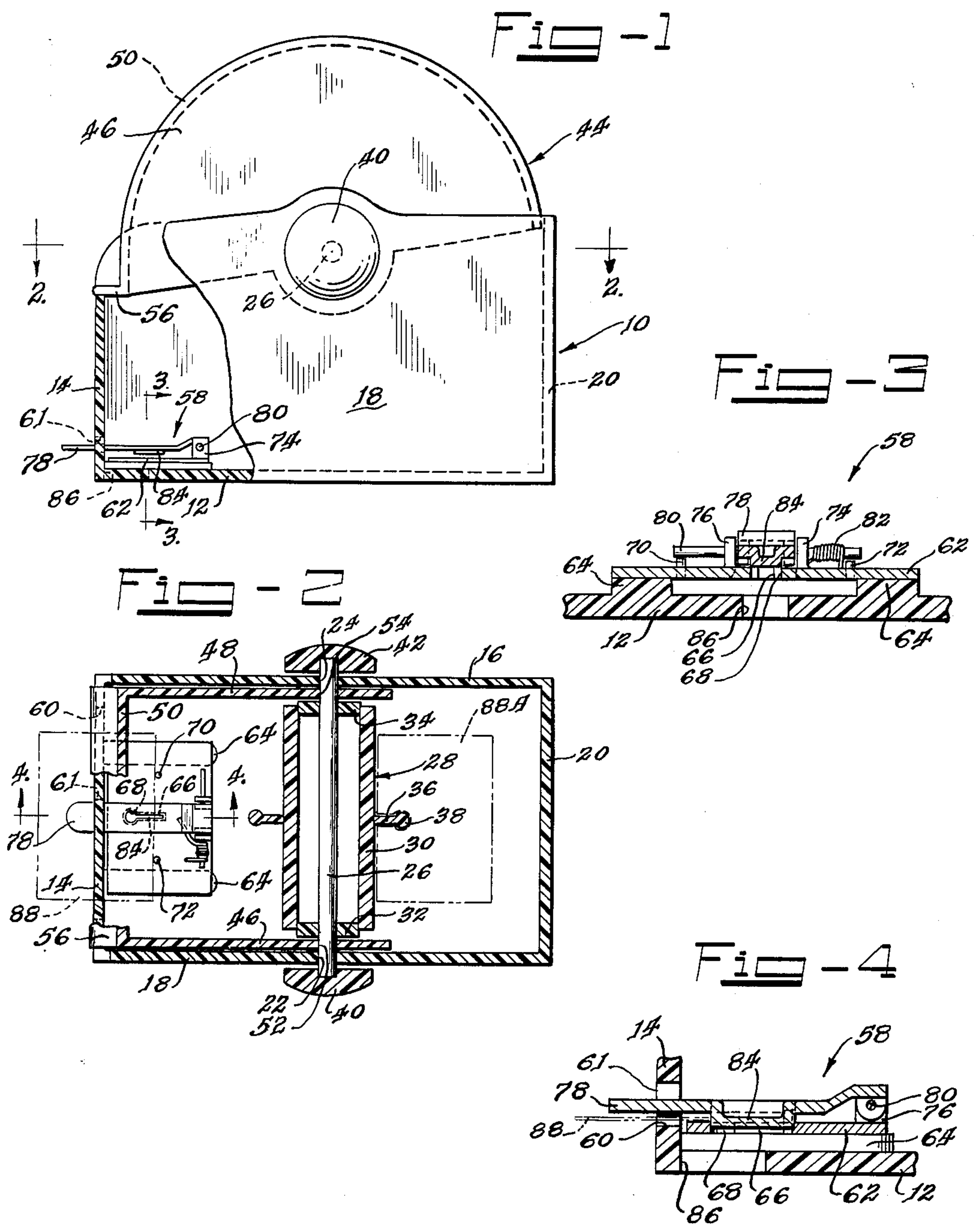
FIGURE 1 is a front elevational view of a card storage and display device constructed according to the teachings of the present invention.
FIGURE 2 is a sectional view taken along the line 2—2 of FIGURE 1.
FIGURE 3 is a sectional view taken along the line 3—3 of FIGURE 1.
FIGURE 4 is a sectional view taken along the line 4—4 of FIGURE 2.

The figures illustrate a preferred construction of a card storage and display device constructed according to the teachings of the present invention. Such a device has a housing 10 with a rectangular base 12. Four walls 14, 16, 18, and 20 extend normally from the base 12 forming a rectangular box. The walls 16 and 18 are provided with openings 22 and 24, respectively, and a shaft 26 is journaled in the openings 22 and 24.

The shaft 26 is a portion of a spindle 28, the spindle having a cylindrical sleeve 30 mounted on the spindle at opposite ends by circular plugs 32 and 34 which are coaxially mounted on the shaft 26. The spindle extends essentially the entire distance between the walls 16 and 18, and is provided at its center with an outwardly extending disc portion 36 which is formed integrally with the sleeve 30. The disc portion 36 is provided with a peripheral ring portion 38 having a diameter greater than the thickness of the disc portion 36, and therefore protruding outwardly therefrom. Knobs 40 and 42 are secured to opposite ends of the shaft 26 on the exterior of the housing 10, so that rotation of either one of the knobs rotates the spindle 28.

The housing 10 is also provided with a cover 44. The cover 44 is formed by two semicircular portions 46 and 48 and an interconnecting curved strip portion 50. The semicircular portions 46 and 48 are provided with apertures 52 and 54, respectively, at their circular centers, and these apertures accommodate the shaft 26 to journal the cover 44 thereabout. The semicircular portions 46 and 48 are disposed on the inner side of the walls 18 and 16, respectively, the plugs 34 and 32 abutting the sides of the semicircular portions 46 and 48 opposite the walls. The cover 44 is provided with a lip 56 which extends outwardly from one end of the strip portion 50, and the lip 56 abuts the side of the first wall 14 of the housing when the cover 44 is in the closed position. When the cover 44 is in the open position, the lip 56 abuts the side of the wall 20 of the housing 10.

A punch 58 is mounted within the housing to the base 12 adjacent the first wall 14. The first wall 14 is provided with an elongated slot 60 which confronts the punch 58 and is disposed parallel to the base 12. At the center of the slot 60, a rectangular opening 61 extends upwardly from the slot 60. The length of the slot 60 is slightly less than the length of the sleeve 30 of the spindle 28, so that only cards shorter than the spindle may be inserted into the slot; any card which will fit within the slot 60 can be accommodated on the spindle.

The punch 58 has a plate 62 which is mounted on the base 12 adjacent to the wall 14. A pair of spacing ribs 64 elevate the plate 62 above the base 12. The plate 62 is provided with an elongated aperture 66 which is disposed normal to the first wall 14, and the aperture 66 is provided with an annular portion 68 at its end adjacent to the wall 14. The annular portion 68 has a larger diameter than the diameter of the ring portion 38 of the spindle 28, but the width of the elongated portion of the aperture 66 is approximately equal to the thickness of the disc portion 36 of the spindle 28. A pair of pins 70 and 72 extend outwardly from the plate 62 and provide a stop to limit the distance a card may be inserted in the slot 60. The pins 70 and 72 are disposed on a plane spaced from the circular portion 68 of the aperture 66 by a distance less than the distance between the cylindrical sleeve 30 of the spindle 28 and the ring portion 38 thereof. The elongated aperture 66 extends to the side of the plane of the pins 70 and 72 remote from the first wall 14 of the housing, so that any card punched by the punch 58 receives a punch which extends through one side of the card, as will become apparent hereinafter.

The plate 62 is provided with a pair of ears 74 and 76 which extend away from the base 12 of the housing, and an arm 78 is pivotally mounted to the ears 74 and 76 by a rod 80. A spring 82 is mounted about the rod 80 and spring biases the arm 78 away from the plate 62. The arm 78 carries a protruding portion 84 which is aligned with the aperture 66 and conforms to the contour thereof. The protruding portion 84 forms a cutting head which snugly fits within the aperture 66 to form a punch. The housing base 12 is provided with an opening 86 directly confronting the aperture 66 so that portions of a card cut away by the punch become expelled from the housing.

Any card which fits within the slot 60 may be mounted to the spindle 28. The card is inserted within the slot 60 and the arm 78 depressed toward the base 12 of the housing, thereby cutting or punching a keyholed shaped slot in the card conforming to the shape of the aperture 66 in the plate 62 of the punch. FIGURE 2 illustrates in dashed line a card designated 88 in position to be punched. The keyholed shaped slot in the card must extend through one edge of the card and be spaced from the edge of the card by a distance less than the distance between the end of the spindle 28 and the disc portion 36 thereof, so that the card may be inserted over the disc portion 36, as indicated by the card 88A in FIGURE 2. When the disc portion 36 of the spindle 28 is accommodated in the keyholed shaped slot, the card will be held in position. It is thus clear that any card having a dimension less than the length of the slot 60 in the first wall 14 of the housing may be secured in position within the card holder.

It is also to be noted that the punch 58 is totally enclosed in a portion of the housing which is otherwise useless. The distance between the axis of the spindle 28 and the punch 58 preferably approaches the radius of the curved strip portion 50 of the cover 44, but need be no greater. By providing a hinge-type punch 58 mounted to the base 12 of the housing, this requirement is readily achieved without increasing the size of the housing 10, that is without making the dimension between the axis of the spindle 28 and the base 12 greater than the inner radius of the cover 44.

Cards mounted to the spindle 28 may be placed in alphabetical order, and since, up to a maximum number of cards, a card may always be inserted between adjacent cards, there is no difficulty maintaining the alphabetical sequence.

Those skilled in the art will readily devise improvements and modifications of the card holder herein disclosed and uses for this storage and display device not set forth herein. It is therefore intended that the scope of the present invention be not limited by the foregoing disclosure, but rather not by the appended claims.

The invention claimed is:

1. A device for storing and displaying cards comprising a housing having a rectangular base and four walls extending normally from the edges of the base, the first of said walls having an elongated slot therein parallel and adjacent to the base having ends spaced to permit a card to be inserted into the housing, the second and third walls of the housing being on opposite sides of the base and having openings therein on an axis parallel to the base and first wall, the slot in the first wall having a length less than the distance between the second and third walls, a spindle journaled within the openings of the second and third walls, said spindle having a cylindrical portion extending between the second and third walls and a disc portion disposed coaxially and normally about the cylindrical portion and spaced from the second and third walls, said disc portion being provided with a peripheral protruding coaxial ring portion, a knob exterior of the housing mounted on one end of the spindle, and a punch mounted on the base adjacent to the slot in the first wall including a plate mounted on the base of the housing provided with an elongated aperture extending therethrough normal to the first wall, the axis of elongation of the aperture being disposed approximately on the plane of the disc, said aperture having a width approximately equal to the thickness of the disc portion of the spindle and having an enlarged portion of the end thereof adjacent to the first wall with a cross section corresponding in shape to the cross section of the ring portion of the disc portion of the spindle and of approximately the same dimension as the ring portion of the disc portion of the spindle, and an arm pivotally mounted on the plate on the side of the aperture opposite the first wall of the housing and having a mechanical linkage extending exterior of the housing, said arm having a protruding punch portion aligned with the aperture in the plate and conforming to the shape of the aperture, whereby a card may be inserted into the slot in the first wall of the housing, the mechanical linkage actuated to punch the card, and the card removed and mounted on the spindle by disposing the aperture punched in the card by the punch about the disc portion of the spindle.

2. A device for storing and displaying cards comprising the elements of claim 1 wherein the punch is provided with means to limit the distance a card can be inserted into the slot of the first wall of the housing, said means having a surface located on a plane parallel to the first wall located on the opposite side of the circular portion of the aperture from the first wall and spaced from the circular portion by a distance less than the distance between the ring portion of the disc portion of the spindle and the cylindrical portion of the spindle.

3. A device for storing and displaying cards comprising the elements of claim 2 wherein the means to limit the distance a card can be inserted into the slot comprises a pair of spaced pins mounted normally to the plate on the plane spaced from the circular portion of the aperture by a distance less than the distance between the ring portion of the disc portion of the spindle and the cylindrical portion of the spindle.

4. A device for storing and displaying cards comprising the elements of claim 2 wherein the punch aperture confronts approximately the center of the slot and the disc portion of the spindle is disposed centrally between the second and third walls.

5. A device for storing and displaying cards comprising the elements of claim 1 wherein the base of the housing is provided with an opening confronting the aperture in the plate of the punch.

6. A device for storing and displaying cards comprising the elements of claim 1 wherein the first wall of the housing is provided with an opening in the first wall, and the mechanical linkage of the arm comprises an elongated extension portion of the arm extending through the opening to the exterior of the housing.

7. A device for storing and displaying cards comprising the elements of claim 4 wherein the first wall of the housing is provided with a rectangular recess extending from the central portion of the slot away from the base and the arm of the punch extends through the recess to the exterior of the housing.

8. A device for storing and displaying cards comprising the elements of claim 1 in combination with a cover having a pair of generally semicircular parallel walls journaled about the spindle within the second and third walls, said cover having an arcuate portion secured to the periphery of the walls and a flange at one end extending outwardly therefrom, said flange abutting the first wall when the cover is closed and abutting the fourth wall when the cover is open, said cover rotating in opening to the interior of the housing, and the punch being totally contained between the first wall and the cover when the cover is in the open position.

References Cited by the Examiner

UNITED STATES PATENTS

| | | | |
|---|---|---|---|
| 480,862 | 8/1892 | Stull | 129—7 |
| 483,089 | 9/1892 | Winternight | 129—7 |
| 544,057 | 8/1895 | Whiteside | 129—8 |
| 586,134 | 7/1897 | Lumley | 129—7 |
| 1,683,491 | 9/1928 | Rippon | 312—183 |
| 2,168,323 | 8/1939 | Bruen | 129—16 |
| 2,399,376 | 4/1946 | O'Hara | 129—16 |
| 2,441,717 | 5/1948 | Nero | 129—16 |
| 2,697,647 | 12/1954 | Stingl et al. | 312—183 |
| 2,703,744 | 3/1955 | Karper | 129—16 X |
| 2,748,775 | 6/1956 | Neilsen | 129—16 |
| 2,795,226 | 6/1957 | Bralove et al. | 129—16.1 |
| 2,898,613 | 8/1959 | Frederick | 11—1 |

FOREIGN PATENTS

| | | |
|---|---|---|
| 321,986 | 9/1902 | France. |
| 127,609 | 1/1902 | Germany. |
| 556,795 | 8/1932 | Germany. |

JEROME SCHNALL, *Primary Examiner.*

EDWARD V. BENHAM, LEONARD VARNER, *Examiners.*

K. E. PRUDEN, *Assistant Examiner.*